United States Patent [19]

Landre et al.

[11] Patent Number: 4,664,486

[45] Date of Patent: May 12, 1987

[54] VARIABLE MAGNIFICATION ENDOSCOPE

[76] Inventors: John K. Landre, 473 Macara Ave. #702, Sunnyvale, Calif. 94086; Jan Hoogland, 41 Los Charros La., Portola Valley, Calif. 94025

[21] Appl. No.: 457,337

[22] Filed: Jan. 12, 1983

Related U.S. Application Data

[63] Continuation of Ser. No. 133,732, Mar. 25, 1980, abandoned.

[51] Int. Cl.⁴ .................. G02B 21/02; G02B 15/00; G02B 23/26; A61B 1/00
[52] U.S. Cl. ........................................ 350/414; 128/4; 350/96.26; 350/423; 350/474
[58] Field of Search ............... 350/415, 416, 423, 427, 350/96.26, 573, 474; 128/4-9

[56] References Cited

U.S. PATENT DOCUMENTS

| | | | |
|---|---|---|---|
| 2,102,274 | 12/1937 | Larimore | 126/6 |
| 2,705,490 | 4/1955 | Littmann | 128/6 |
| 2,927,574 | 3/1960 | Scholz | 128/6 |
| 2,987,960 | 6/1961 | Sheldon | 128/6 |
| 3,355,234 | 11/1967 | Muller | 350/176 |
| 3,556,085 | 1/1971 | Takahashi | 128/6 |
| 3,608,998 | 9/1971 | Rinker | 350/42 |
| 3,941,121 | 3/1976 | Olinger et al. | 128/6 |
| 4,076,018 | 2/1978 | Heckele | 128/6 |
| 4,101,196 | 7/1978 | Imai | 350/96.31 |
| 4,111,529 | 9/1978 | Yamashita | 350/225 |
| 4,138,192 | 2/1979 | Yamashita | 350/25 |
| 4,140,364 | 2/1979 | Yamashita et al. | 350/26 |
| 4,269,485 | 3/1981 | Yamashita et al. | 350/465 |
| 4,300,812 | 11/1981 | Nakahashi | 350/570 |
| 4,312,572 | 1/1982 | Yamashita et al. | 350/423 |

FOREIGN PATENT DOCUMENTS

| | | |
|---|---|---|
| 1117256 | 11/1961 | Fed. Rep. of Germany . |
| 1234920 | 2/1974 | Fed. Rep. of Germany . |
| 2546211 | 4/1976 | Fed. Rep. of Germany . |
| 2640353 | 3/1978 | Fed. Rep. of Germany . |
| 2919205 | 11/1979 | Fed. Rep. of Germany ...... 350/570 |

*Primary Examiner*—John K. Corbin
*Assistant Examiner*—Scott J. Sugarman
*Attorney, Agent, or Firm*—Townsend and Townsend

[57] ABSTRACT

An endoscope whose magnification may be continuously varied from zero to a microscopic magnification of 40x or more while providing full correction for aberrations at widely different magnifications. The objective comprises a positive lens group in a microscope objective configuration, and a front group which typically includes a negative lens and a physical stop in front of the positive lens group generally near the focal plane of the positive lens group. To achieve high magnification, the objective is moved away from the transfer optics, and placed in contact with the object to be viewed. In such a configuration, the positive lens group functions as a microscope objective while the negative lens group's contribution to the aberrations is small. At low magnification, the negative lens group cooperates with the positive lens group to provide a wide angle lens. Pupil stabilization is achieved by placing the physical stop so that when the endoscope is used in the microscope mode, the physical stop between the positive and negative lens groups is ineffective or marginally effective. This permits the maximum numerical aperture consistent with the physical diameter of the positive lens group. However, the physical stop between the positive and negative lens groups comes into play when the object plane moves away from the negative lens group. The field lens located at the image plane receives the marginal chief ray at a nearly constant small angle over the entire range of magnification. This allows image transfer to be achieved with conventional means such as alternating field and relay lenses.

19 Claims, 10 Drawing Figures

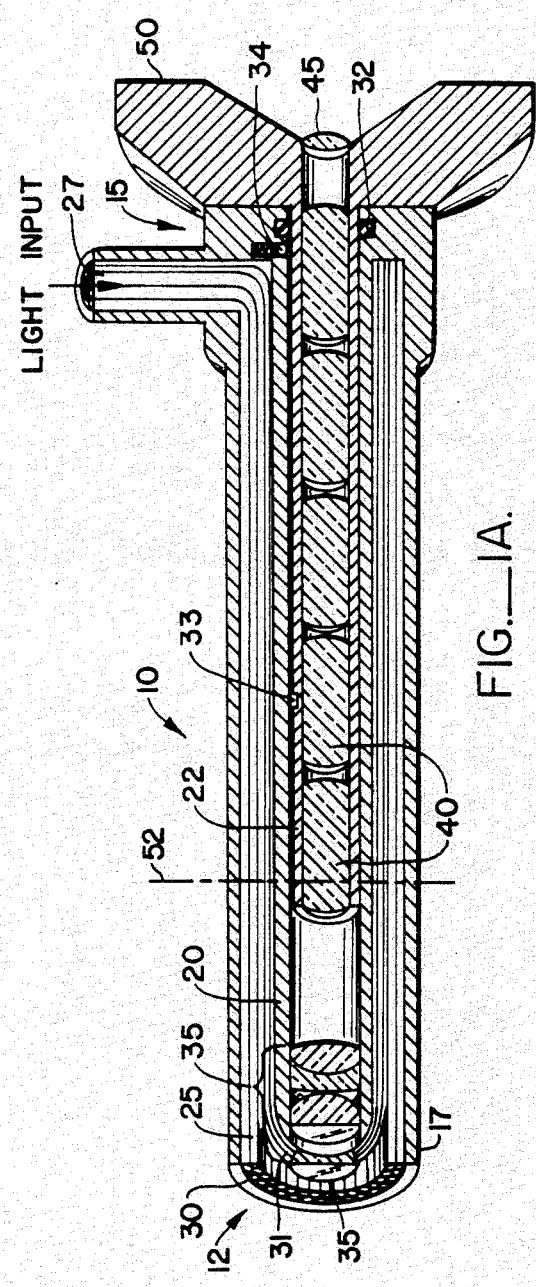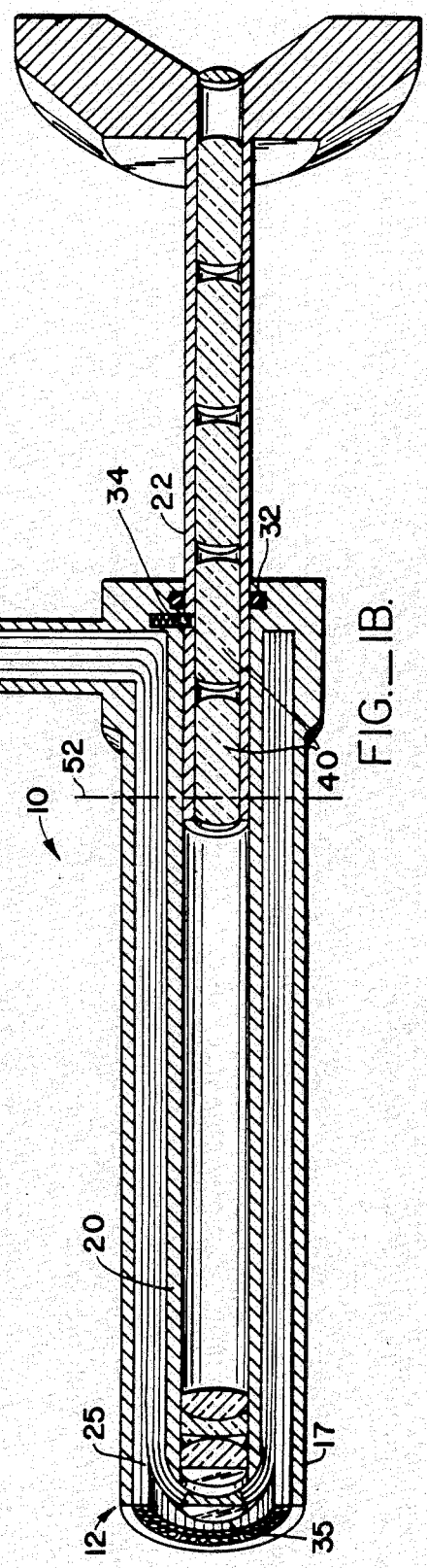

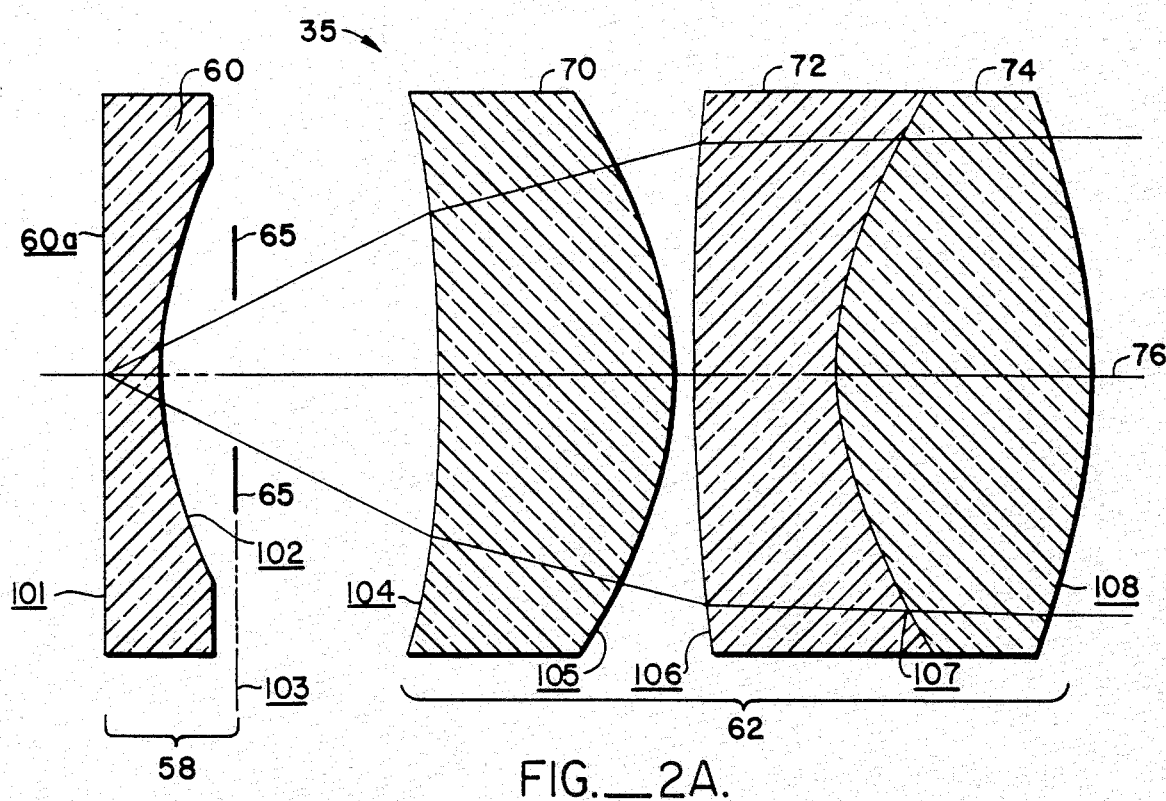
FIG._2A.
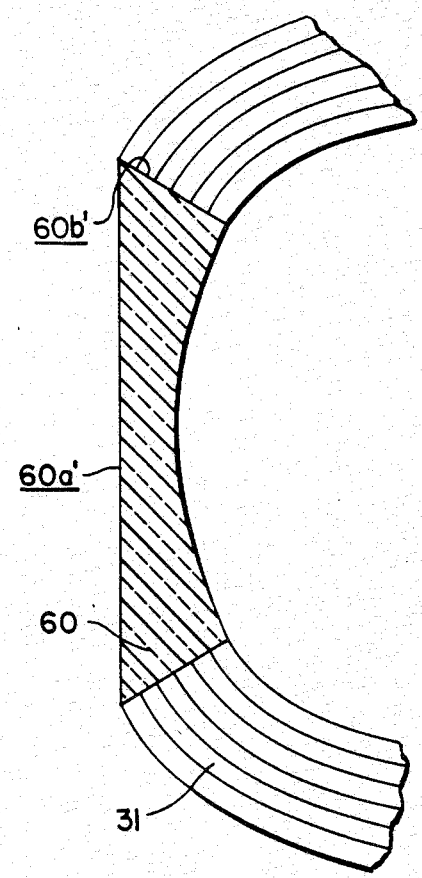
FIG._2B.

FIG._3A.
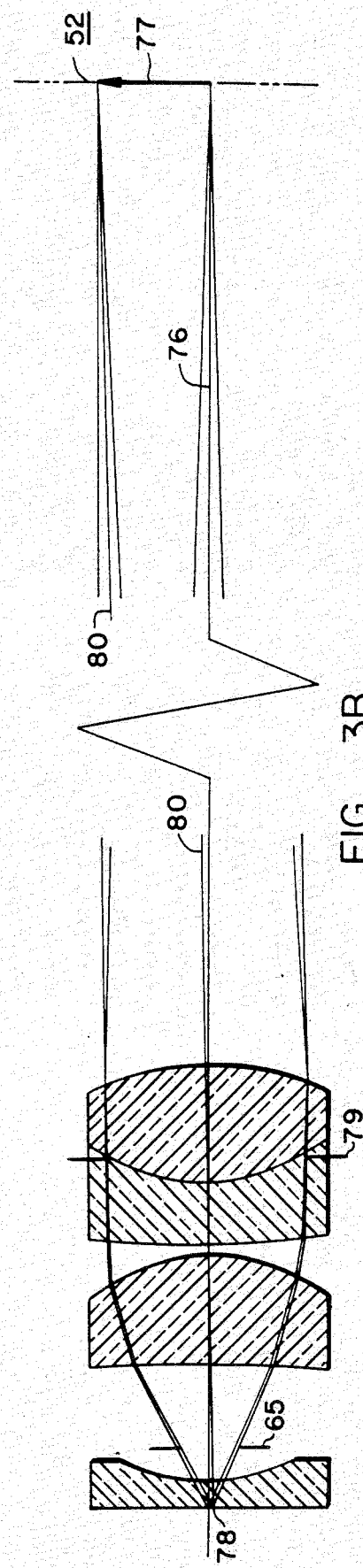
FIG._3B.

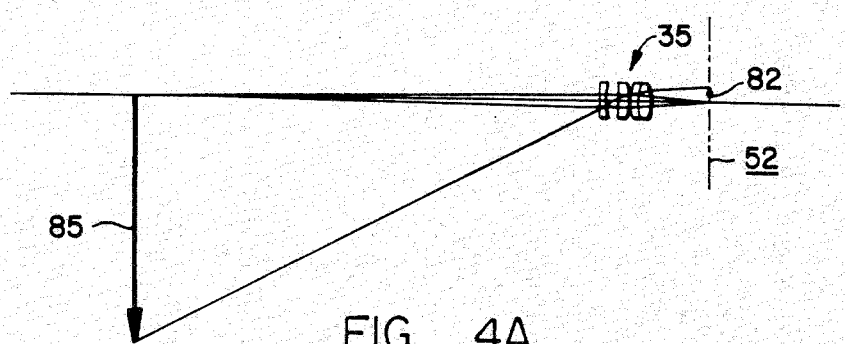
FIG._4A.
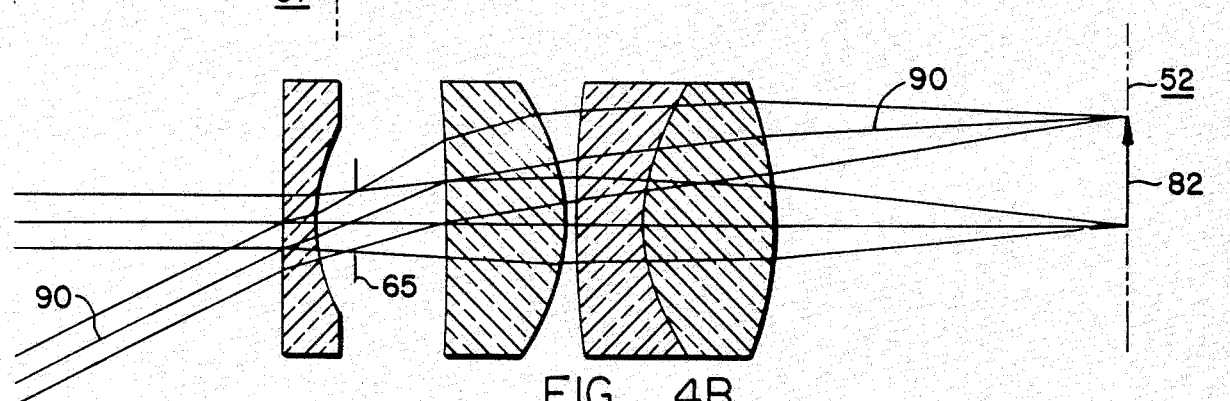
FIG._4B.
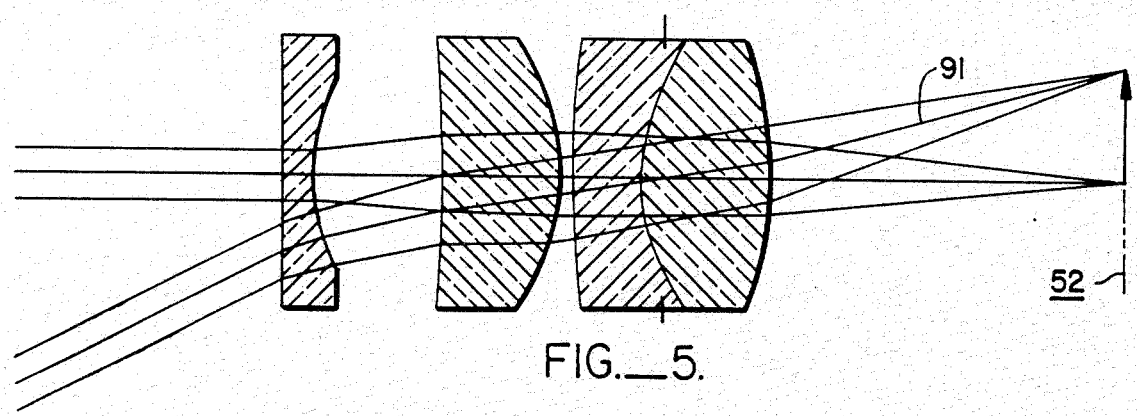
FIG._5.
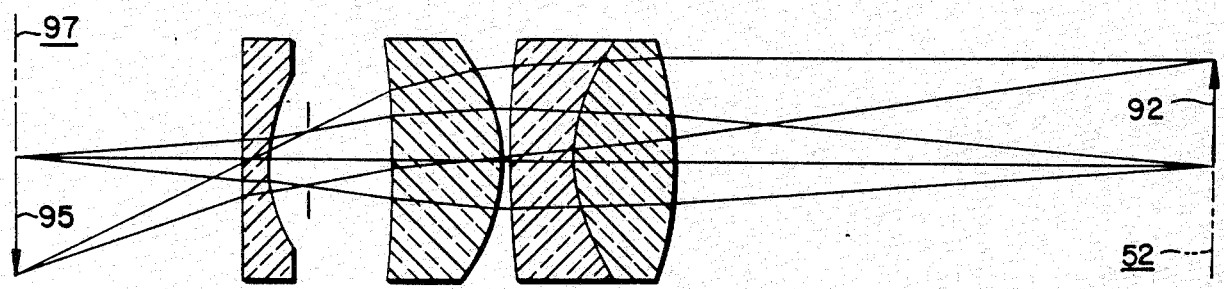
FIG._6.

VARIABLE MAGNIFICATION ENDOSCOPE

This is a continuation of application Ser. No. 133,732, filed Mar. 25, 1980 now abandoned.

FIELD OF THE INVENTION

The present invention relates generally to endoscopes, and more specifically to variable magnification endoscopes.

BACKGROUND OF THE INVENTION

An endoscope is an optical instrument for viewing and examining the interior of various body cavities, such as the lung, bladder, abdominal cabity or knee joint. Access to the interior body region may be via a natural body conduit or, in the case of body cavities not so accessible, by a small surgical incision. Broadly, the endoscope comprises a long thin tube, the distal (leading) end of which is inserted into the patient. An eyepiece is mounted to the proximal end of the tube, and within the tube are housed an image-forming objective at the distal end, fiber optic or discrete transfer optical elements for transmitting the optical image formed by the objective to the eyepiece outside the body for viewing by the examining physician, and fiber optic elements for transmitting light from outside the patient to the interior regions under examination for illumination thereof. The illumination fiber optics typically occupy an annular region surrounding the objective and transfer optical elements. When discrete transfer optics are used rather than fiber optics, the transfer optics typically include a front field lens which defines the image plane for all magnification conditions, and alternating relay and field lenses. The endoscope may be rigid or flexible, depending on its intended use.

The realm of endoscopic procedures includes, in addition to examination, the excision and removal of tissue. For example, it is a common technique to remove polyps and tumors by such techniques, thus avoiding open surgery. This is accomplished by providing blades or hot wires at the end of the endoscope for excision, and appropriate conduits for withdrawal of the excised tissue.

It often happens that endoscopic exploration is performed in conjunction with a biopsy. In such a procedure, the surgeon explores the interior of the body cavity, and upon noticing a suspicious looking region having a tumor, excises a small piece of tissue which is withdrawn for the biopsy. The biopsy is a procedure involving sectioning and microscopic examination in a pathology lab. The result of the biopsy is typically made available within a day or two, and if the results indicate a malignancy, the patient submits to surgery for removal of the tumor, or undergoes other appropriate treatment.

It is immediately apparent that while the use of the endoscope eliminates open surgery for the performing of the biopsy, and further can even avoid open surgery for removal of the tumor, the present procedure involving an intermediate pathological examination requires that the patient be subjected to two surgical procedures, each of which may have to be accompanied by a general anesthetic. Furthermore, the biopsy results may cause the surgeon to wish to perform further biopsy procedures.

This difficulty could be ovecome if an endoscope capable of viewing microscopically as well as telescopically could be used. With such an instrument, the examining physician could scan the interior region, and upon noticing a suspicious region, directly view in situ the single cells to make a pathological determination during the course of a single endoscopic procedure. Variable magnification endoscopes re known. A typical technique for achieving this result is shown in U.S. Pat. Nos. 3,608,998 and 4,076,018 and provides variable magnification elements near or in the eyepiece of the endoscope. Such an arrangement has the clear disadvantage that the resolution of the instrument is fixed once the front lens group (objective) is fixed. Thus, at the microscopic setting, the increased magnification is likely not to be accompanied by correspondingly increased resolution. A further difficulty with providing a variable magnification endoscope that allows true microscopic as well as telescopic examination arises from the great difficulty in correcting a lens for more than one set of conditions, unless a zoom lens having elements movable with respect to one another is used. While it is conceptually easy to visualize such a zoom lens at the distal end of the endoscope, such a solution is highly impractical due to the fact that zoom lens designs dictate a complex mechanical configuration and many lens elements. Since endoscope lens elements typically have a diameter in the neighborhood of two to three millimeters, a zoom lens is clearly impractical in the context of an endoscope.

U.S. Pat. No. 3,941,121 discloses an endoscope having an objective, the elements of which are fixed relative to one another, that is relatively movable with respect to a fiber optics transfer system. However, at the high magnification necessary for microscopy, the objective disclosed therein is incapable of producing the necessary image resolution. More specifically, it is impossible to obtain a sufficient numerical aperture at the level of correction necessary for performing pathological microscopy.

A further difficulty arises in the interaction between the objective and the transfer system. The use of a fiber optics transfer system tends to be accompanied by a loss in resolution. While this situation can be improved somewhat through the use of exotic techniques such as vibrating the input end of the fiber bundle or introducing aberrations which are subsequently corrected, maximum resolution is still likely to be achieved through the use of discrete lenses (alternating field and relay lenses). However, when discrete transfer optics are used, the problem of pupil coupling is aggravated. In particular, pupil coupling is critical in order to provide evenness of illumination, but where the objective moves relative to the transfer optics, the exit pupil location varies so much with large magnification changes that the image transfer to the eyepiece suffers unacceptable vignetting.

U.S. Pat. No. 4,111,529 discloses an endoscope objective for use in wide angle viewing, but the objective does not possess sufficient resolution to render it suitable for microscopic viewing. Moreover, the numerical aperture is insufficient due to the stop positioning disclosed.

Therefore, while variable magnification endoscopes are known, and microscopic endoscopes are known, there is presented the need for an endoscope that provides a continuous variation of magnification over a wide range while providing suitable corrections and pupil coupling under such widely varying conditions.

SUMMARY OF THE INVENTION

The present invention provides an endoscope whose magnification may be continuously varied from zero to a microscopic magnification of 40× or more at the objective while providing full correction for aberrations at widely different magnifications.

The above results are achieved by moving the objective only with respect to the transfer optics. The objective comprises a positive lens group in a microscope objective configuration, and a front group which typically includes a negative lens group (which may comprise a single element) and a physical stop in front of the positive lens group (between the positive and negative lens groups), the stop being located generally near the focal plane of the positive lens group.

To achieve high magnification, the objective is moved away from the transfer optics, and placed in contact with the object to be viewed. In such a configuration, the outer surface of the negative lens group functions as an object plane locator. The positive lens group functions as a microscope objective while the negative lens group's contribution to the aberrations is small. At low magnification, the negative lens group cooperates with the positive lens group to provide a wide angle lens. In such a configuration, the negative lens group acts as a field expander.

Although the wide range of operating conditions makes a normal computer solution for an optimum set of optical parameters ill-conditioned, the present design allows a convergent solution as follows. The positive lens group is initially designed as a high power microscope objective whose parameters are chosen to substantially fully correct aberrations. This is done without reference to the front group. The parameters for the negative lens group and the stop are then chosen to optimize the objective as a wide angle lens. The field aberrations of the objective in the wide angle mode are typically most sensitive to the stop location and size. The stop parameters (as well as those of the negative lens group), once established, may have a deleterious effect on the performance in the microscope mode. The positive group is then re-optimized as a microscope objective, leaving the parameters of the negative group and the stop fixed, but taking them into account in the overall optimization. This sequence may then be repeated to provide full correction for two widely different magnifications. At intermediate magnifications, the objective is surprisingly well corrected.

According to a further aspect of the present invention, pupil stablilization is achieved by placing the physical stop so that when the endoscope is used in the microscope mode, the physical stop between the positive and negative lens groups is ineffective or marginally effective. This permits the maximum numerical aperture consistent with the physical diameter of the positive lens group. Regardless of whether the pupil is at the stop or the positive group, at high magnification, the chief ray is nearly parallel to the optic axis since the distance between the objective and the image plane is large relative to the diameter of the lens. However, the physical stop between the positive and negative lens groups comes into play when the object plane moves away from the negative lens group. The location of the stop is chosen to be near the focal plane of the positive lens group, thus providing a substantially parallel chief ray for conditions of lower magnification. Thus, the field lens located at the image plane receives the marginal chief ray at a nearly constant small angle over the entire range of magnification. This allows image transfer to be achieved with conventional means such as alternating field and relay lenses.

For a further understanding of the nature and advantages of the present invention, reference should be made to the remaining portions of this specification and to the attached drawings.

BRIEF DESCRIPTION OF THE DRAWINGS

FIG. 1A is a simplified sectional oblique view of a variable magnification endoscope according to the present invention, with the endoscope in a position for producing wide-angle viewing at low magnification;

FIG. 1B is a similar view of the endoscope in a position for microscopic, large magnification viewing;

FIG. 2A is an optical schematic of the endoscope objective;

FIG. 2B shows a modified front element;

FIGS. 3A and 3B are ray diagrams showing image formation and pupil definition in the microscope mode;

FIGS. 4A and 4B are ray diagrams showing image formation and pupil definition in the wide-angle, telescopic mode;

FIG. 5 is a ray diagram illustrating the role of the intermediate physical stop in the wide angle mode; and FIG. 6 is a ray diagram showing image formation and pupil definition at an intermediate magnification setting;

DETAILED DESCRIPTION OF THE INVENTION

FIG. 1A is a simplified, sectioned, oblique view of an endoscope 10 according to the present invention. Endoscope 10 is an elongate instrument characterized by a distal end 12 for insertion into a patient's internal body region and a proximal end 15 that remains outside the patient. Transverse dimensions are greatly exaggerated for clarity; it should be understood that endoscope 10 typically has a length of about 250 millimeters and an outer diameter of about 5 millimeters.

The mechanical construction of the endoscope is defined primarily by three coaxial thin-walled tubes 17, 20, and 22, of decreasing diameters, with outer tube 17 defining the outermost diameter of the endoscope. Outer tube 17 and middle tube 20 are fixed relative to one another and sized to define therebetween an annular region within which is located a fiber optics lighting bundle 25 having an input end 27 near proximal end 15 and an output end 30 generally at distal end 12. As will be described below, at least a portion 31 of bundle 25 may be angled to terminate so that the fibers therein are directed toward the central axis. Inner tube 22 is movable relative to tubes 17 and 20, and is sized to slide smoothly within the bore of middle tube 20. This relative sliding movement provides variable magnification as will be described in detail below. In order to provide a seal between the interior of tube 20 and the outside atmosphere, appropriate sealing means such as an O-ring seal 32, is provided. A groove 33 in inner tube 22 and a ball plunger 34 provide a positioning detent to facilitate relative positioning.

An objective lens system 35, to be described in detail below, is rigidly mounted within middle tube 20 at proximal end 12. The remaining optical components are rigidly mounted within inner tube 22 so that they may move relative to objective 35 when inner tube 22 is moved relative to outer tube 17. In particular, the optical elements mounted within inner tube 22 include a transfer system defined by a plurality of field and relay lenses 40 and an eyepiece 45 at the end of inner tube 22 remote from objective 35. Lenses 40 are preferably rod lenses of a type well known in the endoscope art. Alternately, a fiber optics transfer system within inner tube 22 may be used. An eyepiece ring 50 surrounds eyepiece 45 and is rigidly mounted to inner tube 22. The image formed by objective 35 must be located in a plane 52 fixed relative to the transfer optics in order to provide proper eyepiece image formation. Thus, depending on the distance between objective 35 and the object to be viewed, inner tube 22 must be moved in order to properly locate the image formed by objective 35.

FIG. 1A shows endoscope 10 with inner tube 22 at a position of closest approach to objective 35. FIG. 1B is a similar view to FIG. 1A except that inner tube 22 is in a position farther removed from objective 35. As will be discussed below, this latter position provides high magnification. Thus, from a physician's point of view, examination proceeds as follows. Endoscope 10 is inserted into the patient while in the position shown in FIG. 1A. This provides a wide-angle view that permits the physician to scan the interior of the region under examination. When a closer examination of a particular spot is desired, the physician moves distal end 12 closer to the spot and withdraws inner tube 22 by an amount necessary to provide a focused image in eyepiece 45. When microscopic examination is required, the outer (front) surface of objective 35 is brought into proximity with the spot to be examined, and inner tube 22 is withdrawn to the position of FIG. 1B which represents the maximum extension that has any practical usefulness. In the preferred embodiment, microscopic examination occurs with the front surface of objective 35 in actual contact with the spot under examination.

FIG. 2A is an optical schematic of objective 35. Objective 35 comprises a front group 58 and a magnifying positive lens group 62. Front group 58 preferably comprises a negative element 60 and an aperture stop 65 located between negative element 60 and positive group 62. Negative element 60 preferably has a convex or planar front surface 60a which is exposed at distal end 12 and is brought into contact with the object to be microscopically examined. Positive lens group 62 comprises a triplet having elements 70, 72 and 74 with the latter two forming a cemented doublet. All the lens elements are centered on a common optic axis 76.

FIG. 2B illustrates an alternate form of front negative element 60, designated 60', modified to permit illumination of an object contacting the front surface, designated 60a'. To accomplish this, peripheral regions of element 60' are cut away to define a frustoconical peripheral surface 60b'. The ends of the fibers in bundle portion 31 terminate at surface 60b' so that the light emanating from the fiber ends is directed forward toward the central region of surface 60a'.

As was described above, microscopic examination occurs with front surface 60a of negative lens 60 contacting the object, thus acting as an object plane locator. The contribution of negative lens 60 to the aberrations is small, thus allowing the parameters of positive lens group 62 to be chosen to provide a substantially fully corrected microscope objective. Once front lens surface 60a is moved away from the object, negative lens 60 acts as a field expander, and its effect on field aberrations is no longer small. Thus, the parameters of negative lens 60 and aparture stop 65 may be chosen to correct the field aberrations of the entire objective at the position of low magnification.

The above description regarding the selection of the optical parameters is somewhat of an oversimplification, since the parameters of positive group 62 are affected by the insertion of negative element 60 and aperture stop 65. In particular, when these elements (especially stop 65), are inserted, the performance of positive group 62 as a microscope is typically degraded. However, re-optimization may be achieved, as for example by adjusting the thicknesses of one or more of the triplet elements to effectively eliminate the effect of aperture stop 65 during microscopic viewing. Once this is done, the front group may be re-adjusted to further optimize the objective for wide angle viewing. This process may be iterated to bring the aberrations to a desired level of correction. Since the effect of the front group on microscopic viewing is small (once the stop effect is minimized or eliminated), the parameters for the front group and the positive group become generally decoupled, and the iterative process is convergent. With objective 35 thus corrected at its two extremes of magnification, it has been found that aberrations at intermediate magnifications are surprisingly small. A further constraint on the location and size of aperture stop 65 is imposed by pupil coupling considerations to be described below.

FIGS. 3A and 3B are ray diagrams showing the formation of an image 77 in image plane 52 for an object 78 located at front surface 60a of negative lens 60 FIG. 3B is a fragmented enlargement of FIG. 3A. In this position, corresponding to FIG. 1B, the physical mounting of positive lens group 62 defines the stop location at a position 79. Given the large distance between image plane 52 and objective 35 in relation to the diameter of inner tube 22, the marginal chief ray, designated 80, is at a small angle (about 1°) with respect to the optic axis. In this position, aperture stop 65 serves no function so that an image of maximum brightness occurs.

FIGS. 4A and 4B are ray diagrams showing the formation of an image 82 in image plane 52 for telescopic viewing of an object 85 positioned in an object plane 87 at a substantial distance from front surface 60a. The maximally off-axis bundle is characterized by a chief ray 90 which is incident on the transfer optics at the same small angle as in FIGS. 3A and 3B. This matching of the chief ray angle results from the positioning of stop 65 proximate the focal plane of positive lens group 62. To understand the significance of stop 65, reference should be had to FIG. 5 which shows image formation as in FIG. 4B, except for the absence of stop 65. Under these circumstances, the stop location is defined by the positive lens mount, and thus the maximally off axis bundle is characterized by a chief ray 91 which is incident on the transfer optics at a relatively large angle (say about 14°). This leads to unacceptable non-uniformity of illumination over the entire field of view if discrete transfer optical elements are used.

FIG. 6 is a ray diagram showing the formation of an image 92 in image plane 52 for viewing of an object 95 in an object plane 97 at an intermediate distance from front surface 60a. For this position of approximate unit magnification, aperture stop 65 remains effective to stabilize the pupil so that the marginal chief ray enters the transfer optics at a small angle. As the magnification is increased, the aperture stop becomes less effective so that it is ineffective or only marginally effective at the microscopic position described above.

For purposes of illustration, the optical parameters of a particular embodiment will be set forth. The geometric parameters include the radii and separation of all the element surfaces. In order to make the nomenclature uniform and transparent, and referring to FIG. 2A, surfaces proceeding back from front surface 60a will be numbered in numerical order with surface 60a being designated for the present purpose as surface 101. In particular, negative lens element 60 is characterized by front and rear surfaces 101 and 102, aperture stop 65 is located within a plane 103, positive singlet 70 has surfaces 104 and 105, doublet element 72 has surfaces 106 and 107, and doublet 74 shares surface 107 and has rearmost surface 108. The radius of a given surface $10i$ will be denoted by $r_i$ so that front surface 101 has radius $r_1$, while rear-most surface 108 has radius $r_8$. Aperture stop has a diameter $d_3$. Additionally, the distance between a given pair of adjacent surfaces $10j$ and $10k$ will be designated $t_{jk}$. Moreover, the index of refraction and dispersion factor of the medium between surfaces $10j$ and $10k$ will be designated $n_{jk}$ and $df_{jk}$. With this nomenclature established, the parameter for a specific embodiment are given in Table I. Dimensions are in millimeters.

| | | |
|---|---|---|
| $r_1 = \infty$ | | |
| $t_{12} = 0.250000$ | $n_{12} = 1.792266$ | $df_{12} = 0.064$ |
| $r_2 = 1.798864$ | | |
| $t_{23} = 0.300000$ | air | |
| $d_3 = 0.600000$ | | |
| $t_{34} = 0.759514$ | air | |
| $r_4 = -13.198478$ | | |
| $t_{45} = 1.000000$ | $n_{45} = 1.885793$ | $df_{45} = 0.156$ |
| $r_5 = -1.798864$ | | |
| $t_{56} = 0.100000$ | air | |
| $r_6 = 8.851848$ | | |
| $t_{67} = 0.600000$ | $n_{67} = 1.855035$ | $df_{67} = 1.033$ |
| $r_7 = 1.798864$ | | |
| $t_{78} = 1.000000$ | $n_{78} = 1.554398$ | $df_{78} = 0.069$ |
| $r_8 = -3.077912$ | | |

The objective described above is color corrected for blue (4800A), green (5461A) and red (6438A) light with equal spectral weights. The resulting objective has an effective focal length of 2.0665 mm and a back focus of 85.5176 mm with a magnification of $-39.969367$ at a numerical aperture of 0.5 in the microscopic mode. The front focus is located near (slightly behind) front surface 101 to provide such high magnification. This is also seen in FIG. 6 where the ray emerging parallel to the optical axis crosses the axis just inside the negative front element.

In summary it can be seen that the present invention provides an endoscope objective that is substantially fully corrected for field aberrations over an extremely wide range of magnification. Moreover, the design provides a stabilized pupil location when such is necessary, as when discrete transfer optical elements are used. For an endoscope using fiber optics transfer, the pupil stabilization requirement may be relaxed and parameters varied to provide other advantages such as greater ease of fabrication and the like.

While the above provides a full and complete disclosure of the preferred embodiments of the invention, various modifications, alternate constructions, and equivalents may be employed without departing from the true spirit and scope of the invention. For example, it should be possible to make front element 60 flat on both of its surfaces, relying on aperture stop 65 to optimize the objective as a wide-angle lens. In such a case, aperture stop 65 would typically be defined by a coating on the rear surface of front element 60. Moreover, while a particular physical stop location and size are shown, it should be understood that the aperture stop could in principle be located at other optically equivalent points. Therefore, the above description and illustrations should not be construed as limiting the scope of the invention which is defined by the appended claims.

We claim:

1. An endoscope having distal and proximal ends, comprising:

optical transfer means for transferring at fixed magnification an image formed at an image plane to said proximal end, said image plane being fixed relative to said optical transfer means;

a negative lens at said distal end, said negative lens having a front surface;

a positive lens between said negative lens and said image plane;

said positive lens and said negative lens being characterized by respective first and second sets of optical parameters, each of said sets of optical parameters including geometrical parameters, namely surface radii and surface locations along an optical axis, and optical material parameters, namely refractive index and dispersion values;

means for rigidly coupling said positive lens and said negative lens to one another while preventing relative movement therebetween to define an objective; and slidable support means for permitting said objective to move with respect to said image plane over a range along said optical axis, said range including a first position of maximum magnification wherein an object proximate the front surface of said negative lens is imaged in said image plane, and a second position of relatively lower magnification wherein an object at a substantial distance from said front surface of said negative lens is imaged in said image plane;

said first and second sets of optical parameters being chosen such that said objective in said first position operates as a substantially fully corrected microscope objective and said objective in said second position operates as a wide angle lens having substantially fully corrected field aberrations;

the operation of said objective as a substantially fully corrected microscope objective being largely determined by said first set of optical parameters with said negative lens contributing little to the aberrations and overall power of said objective;

said second set of optical parameters being chosen to correct field aberrations of said object when said objective operates as a wide angle lens.

2. The invention of claim 1 wherein said positive lens is characterized by a focal plane located between said positive lens and the front surface of said negative lens, and further comprising an aperture stop located at a position that is optically equivalent to a position in the vicinity of said focal plane such that the marginal chief ray intersects said image plane in a direction approximately parallel to said optical axis for image formation in said second position of low magnification.

3. An objective for placement at a leading end of an endoscope comprising:

magnification means characterized by an optic axis; and a front group including means defining a front surface;

means for rigidly coupling said magnification means and said front group while preventing relative movement therebetween;

said front group and said magnification means being characterized by respective first and second sets of optical parameters chosen to define a front focus of said objective which is located proximate said front surface such that said objective operates as a substantially fully corrected microscope objective for magnification of an object located at a position proximate said front surface, and said objective operates as a wide angle lens having substantially fully corrected field aberrations for imaging of an object located a substantial distance in front of said front surface, each of said sets of optical parameters including geometrical parameters, namely surface radii and surface locations along said optical axis, and optical material parameters, namely refractive index and dispersion values;

the operation of said objective as a substantially fully corrected microscope objective being largely determined by said fist set of optical parameters with said front group contributing little to the aberrations and overall power of said objective;

said second set of optical parameters being chosen to correct field aberrations of said objective when said objective operates as a wide angle lens.

4. The invention of claim 3 wherein said position proximate said front surface is a position contacting said front surface.

5. The invention of claim 3 wherein said magnification means comprises a positive lens group in a microscope objective configuration.

6. The invention of claim 3 wherein said front group comprises a negative lens.

7. The invention of claim 3 or 4 or 6 wherein said front group includes stop means located such that the marginal chief ray is approximately parallel to the optic axis for an object at a substantial distance ahead of said front surface.

8. The invention of claim 3 or 4 wherein said front group comprises a negative lens and an aperture stop located physically between said magnification means and said negative lens.

9. An endoscope having distal and proximal ends, comprising:

optical transfer means for transferring at fixed magnification an image formed at an image plane to said proximal end, said image plane being fixed relative to said optical transfer means;

magnification means characterized by an optic axis;

a front group including means defining a front surface;

means for rigidly coupling said magnification mens and said front group to one another while preventing relative movement therebetween to define an objective; and slidable support means for permitting said objective to move with respect to said image plane over a range along said optical axis, said range including a first position of maximum magnification wherein an object located at a position proximate said front surface is imaged in said image plane, and a second position of relatively lower magnification wherein an object at a substantial distance from said front surface is imaged in said image plane;

said magnification means and said front group being characterized by respective first and second sets of optical parameters chosen such that said objective operates as a substantially fully corrected microscope objective for said first position and as a wide angle lens that has substantially fully corrected field aberrations for said second position, each of said sets of optical parameters including geometrical parameters, namely surface radii and surface locations along said optical axis, and optical material parameters, namely refractive index and dispersion values;

the operation of said objective as a substantially fully corrected microscope objective being largely determined by said first set of optical parameters with said front group contributing little to the aberrations and overall power of said objective;

said second set of optical parameters being chosen to correct field aberrations of said objective when said objective operates as a wide angle lens.

10. The invention of claim 9 wherein said position proximate said front surface is a position contacting said front surface.

11. The invention of claim 9 wherein said magnification means comprises a positive lens group in a microscope objective configuration.

12. The invention of claim 9 wherein said front group comprises a negative lens.

13. The invention of claim 9 or 10 or 12 wherein said front group includes stop means located such that the marginal chief ray is approximately parallel to the optic axis for an object at a substantial distance ahead of said front surface.

14. The invention of claim 9 or 10 wherein said front group comprises a negative lens and an aperture stop located physically between said magnification means and said negative lens.

15. In an endoscope having distal and poximal ends, optical transfer means for transferring at fixed magnification an image formed at an image plane fixed relative to said optical transfer means to said proximal end, and an objective movable relative to said image plane along an optic axis, said objective being movable over a range including first and second widely spaced positions to permit normal microscopy at large magnification and normal endoscopy at relatively small magnification, the improvement wherein said objective comprises:

a positive lens group in a microscope objective configuration; and a front group including a front element and an aperture stop located between said front element and said positive lens group;

means for rigidly coupling said positive lens group and said front group while preventing relative movement therebetween;

said aperture stop being located so as to be largely ineffective when said objective is in said first position of large magnification and so as to maintain the marginal chief ray approximately parallel to the optic axis for an object at a substantial distance ahead of said front surface;

said positive lens group and said front group being characterized by respective first and second sets of optical parameters chosen such that said objective operates as a substantially fully corrected microscope objective for said first position and as a wide angle lens that has substantially fully corrected field aberrations for said second position, each of said sets of optical parameters including geometrical parameters, namely surface radii and surface locations along said optical axis, and optical material parameters, namely refractive index and dispersion values;

the operation of said objective as a substantially fully corrected microscope objective being largely determined by said first set of optical parameters with said front group contributing little to the aberrations and overall power of said objective;

said second set of optical parameters being chosen to correct field aberrations of said objective when said objective operates as a wide angle lens.

16. The invention of claim 13 wherein said optical parameters provide generally fully corrected field aberrations at positions intermediate said first and second positions.

17. The invention of claim 15 wherein said front group comprises a negative lens and an aperture stop located physically between said magnification means and said negative lens.

18. The invention of claim 3 or 9 or 15 wherein said front group includes means defining a peripheral surface having portions with normal axis at an acute angle with respect to said optic axis to permit illumination of said object located at said position proximate said front surface.

19. The invention of claim 18 wherein said peripheral surface is frustoconical.

* * * * *

UNITED STATES PATENT AND TRADEMARK OFFICE
CERTIFICATE OF CORRECTION

PATENT NO. : 4,664,486

DATED : May 12, 1987

INVENTOR(S) : John K. Landre, Jan Hoogland

It is certified that error appears in the above-identified patent and that said Letters Patent is hereby corrected as shown below:

Claim 3, column 9, line 6, please change "said front group and said magnification means" to --said magnification means and said front group--.

Claim 3, column 9, line 24, please change "fist" to --first--.

Signed and Sealed this

Twelfth Day of September, 1989

Attest:

DONALD J. QUIGG

Attesting Officer

Commissioner of Patents and Trademarks